United States Patent [19]
Chambers et al.

[11] 3,736,764
[45] June 5, 1973

[54] TEMPERATURE CONTROLLER FOR A FLUID COOLED GARMENT

[75] Inventors: Alan B. Chambers, Los Altos; James R. Blackaby, Palo Alto; John Billingham, Portola Valley, all of Calif.

[73] Assignee: The United States of America as represented by the Administrator of the National Aeronautics and Space Administration, Washington, D.C.

[22] Filed: Apr. 25, 1972

[21] Appl. No.: 247,481

[52] U.S. Cl. ............... 62/89, 165/46, 62/176, 62/259, 62/207, 62/209, 2/2.1
[51] Int. Cl. ............................................. F25d 17/06
[58] Field of Search ............... 165/46; 62/89, 93, 62/176, 259, 207, 209

[56] References Cited

UNITED STATES PATENTS

| | | | |
|---|---|---|---|
| 2,693,088 | 11/1954 | Green | 165/46 |
| 3,112,792 | 12/1963 | Coleman | 165/46 |
| 3,279,201 | 10/1966 | Wortz | 62/259 |
| 3,507,321 | 4/1970 | Palma | 165/46 |
| 3,648,765 | 3/1972 | Starr | 62/259 |

Primary Examiner—William J. Wye
Attorney—Darrell G. Brekke, Armand G. Morin, Sr. and John R. Manning

[57] ABSTRACT

The inlet coolant temperature to a liquid cooled garment, as worn underneath an air ventilated space suit, is controlled as a function of the wearer's evaporative water loss rate (sweat rate) to provide comfort for the wearer over a wide range of work load rates.

8 Claims, 7 Drawing Figures

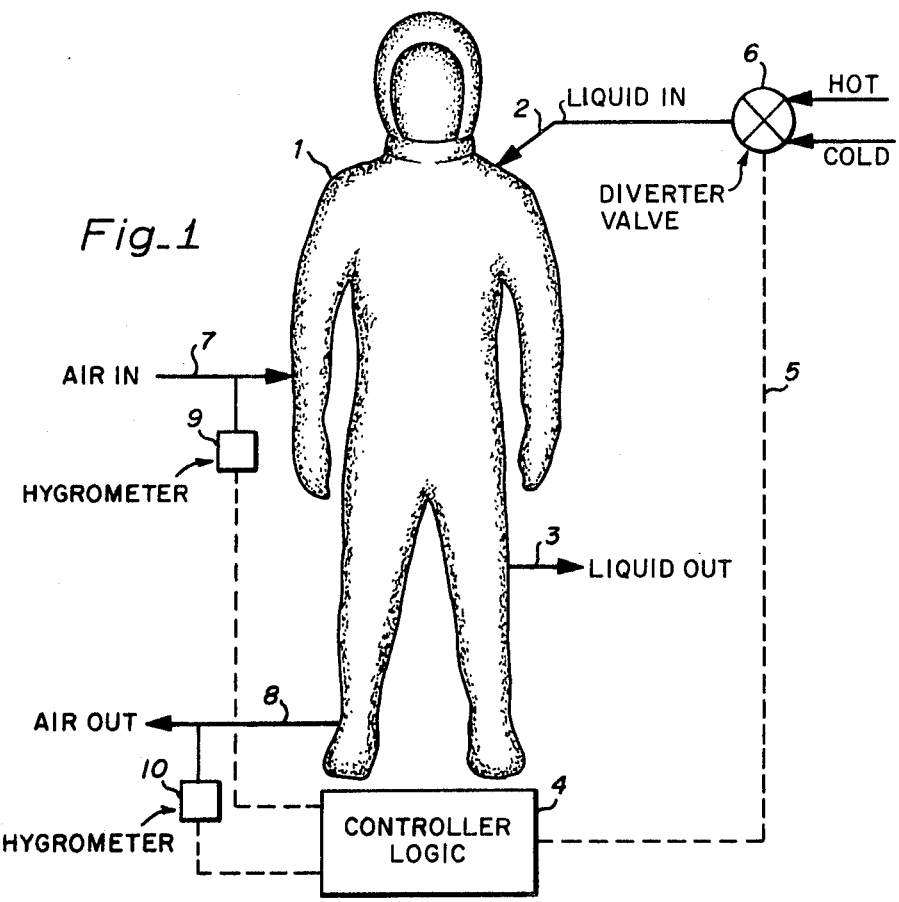
Fig_1
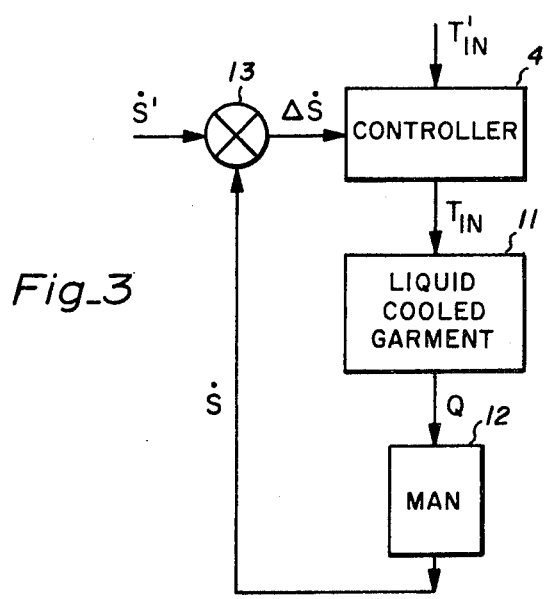
Fig_3

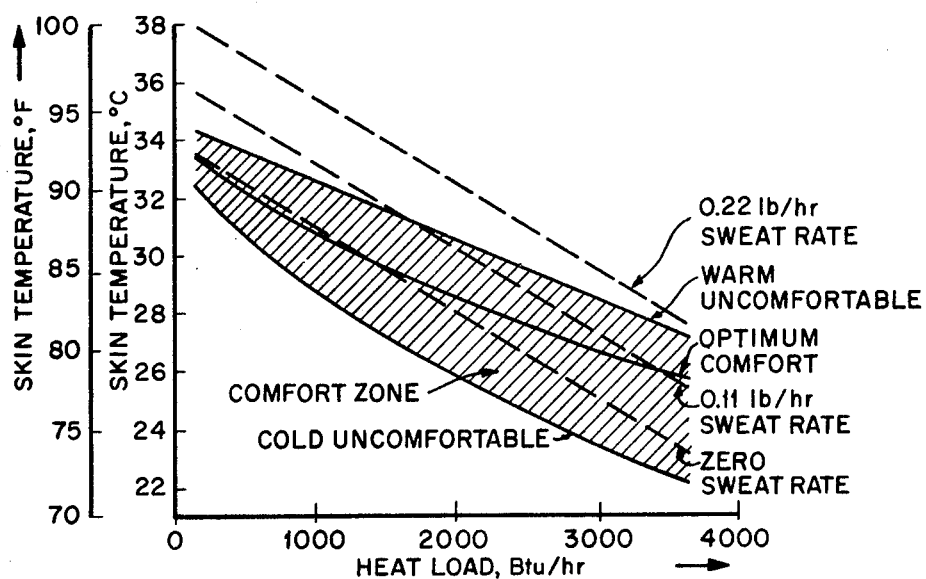
Fig_2
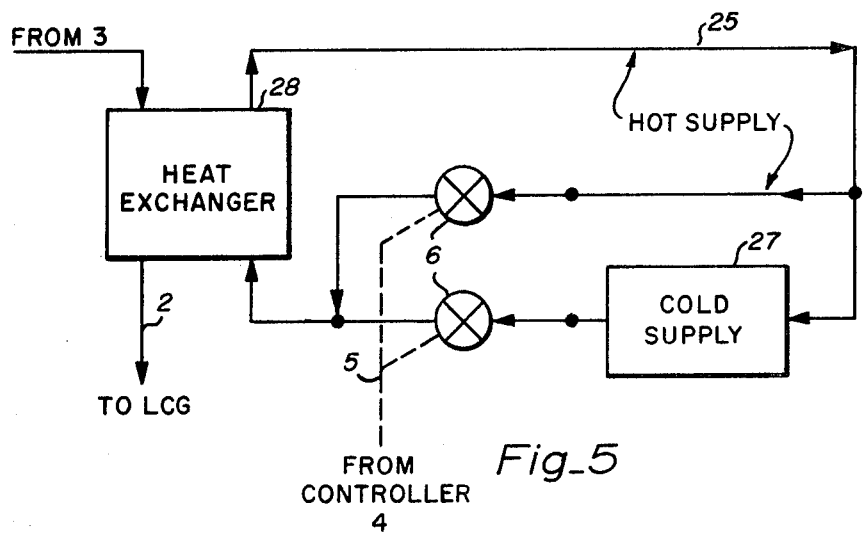
Fig_5

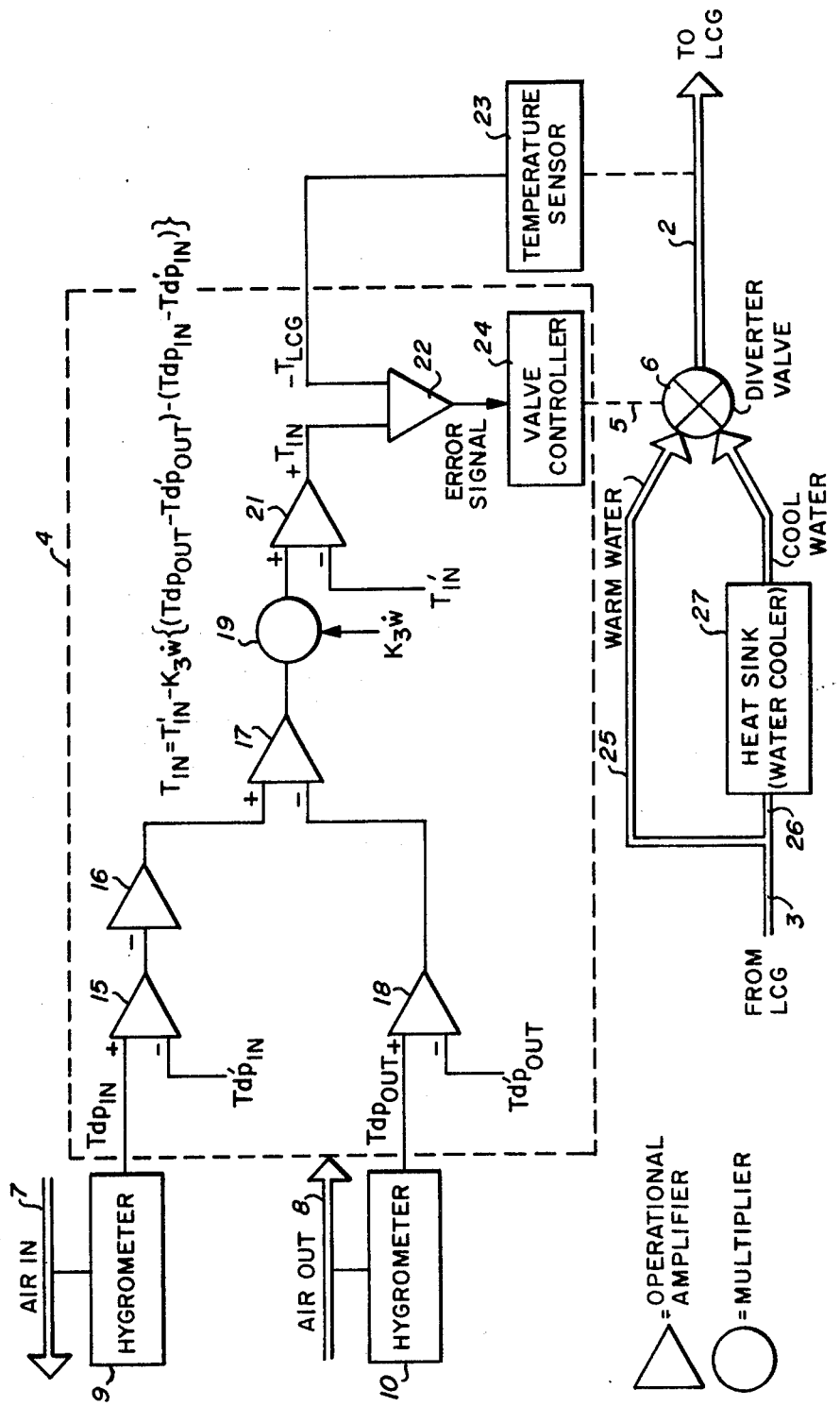
Fig_4

TEMPERATURE CONTROLLER FOR A FLUID COOLED GARMENT

The invention described herein was made by employees of the United States Government and may be manufactured and used by or for the Government for governmental purposes without the payment of any royalties thereon or therefor.

DESCRIPTION OF THE PRIOR ART

When a man is isolated from his environment, as is an astronaut in a pressure suit, auxiliary cooling is required to remove excess metabolic heat to maintain thermal balance. The major portion of this cooling is often accomplished by a liquid cooled garment (LCG), and, in current operations with the Apollo LCG, the astronauts maintain comfort by manually adjusting the inlet temperature of the coolant. This method of control has been adequate, but it would be preferable to have automatic temperature control. In an emergency, an astronaut should be free to concentrate entirely on his immediate situation; furthermore, man may be a poor judge of his own thermal state, especially when his attention is distracted so that his reactions to sensations of warmth and cold are delayed. The development of automatic LCG temperature controllers, responding to an astronaut's heat production rate, has been the subject of several studies.

Heretofore, at least three liquid cooled garment temperature controllers have been proposed. These prior art controllers include a metabolic rate controller, a constant skin temperature controller, and a differential temperature controller.

In the metabolic rate controller, as proposed by Webb et al. in an article titled "Automatic Control of Water Cooling in Space Suits," appearing in NASA CR-1085, 1968, the subject's oxygen consumption is monitored and the controller automatically adjusts the liquid cooled garment inlet temperature to remove the appropriate amount of heat. A linear relation between the metabolic heat produced and oxygen consumption is assumed. Difficulties develop with this approach during periods of rest when slight overcooling sometimes brings about lowering of skin temperature and results in shivering; oxygen consumption then increases, and the controller lowers the temperature still further. Another feedback element would have to be added to this controller to correct this difficulty. In addition, this controller requires a satisfactory method for continuous monitoring of the oxygen consumption of the wearer in his pressure suit.

In the constant skin temperature controller the system is arranged to maintain a constant skin temperature. This system has proved to be stable, but the basic philosophy of a constant skin temperature is at odds with experimental results which show that, for optimum comfort, skin temperature should decrease with an increase in heat production. The constant skin temperature controller should be adequate for low metabolic rates; however, it may allow an excessive amount of sweating at high metabolic rates when a decrease in skin temperature is desirable.

In the differential temperature controller the inlet coolant temperature is regulated as a function of skin temperature and heat removal. A linear relationship between the heat removal rate and comfortable skin temperature is assumed. Skin temperature is determined by averaging the temperatures at four selected points (right calf, over the right kidney, right lower abdomen, and left bicep). The heat removal rate is determined by measuring the difference between the liquid coolant inlet and exit temperatures. For any given heat removal rate, the optimum skin temperature is compared with the actual skin temperature and the liquid coolant inlet temperature is adjusted accordingly.

A disadvantage of the differential temperature controller (and also of the constant skin temperature controller) is the requirement that transducers or sensors be affixed directly on the body of the wearer. Skin sensors, when used for extended periods, are likely to cause discomfort; thus, the acceptability of these controllers is likely to be limited.

Therefore, it is desired to obtain an automatic controller for controlling the inlet temperature of the coolant to a fluid cooled garment without requiring skin sensors.

SUMMARY OF THE PRESENT INVENTION

The principal object of the present invention is the provision of an improved temperature controller for a fluid cooled garment.

In one feature of the present invention, the evaporative water loss rate of the wearer is determined and the temperature of the inlet fluid coolant stream to the fluid cooled garment is controlled as a function of the evaporative water loss rate.

In another feature of the present invention, the inlet fluid coolant temperature $T_{IN}$ to the fluid cooled garment is controlled in accordance with the algorithm:

$$T_{IN} = T'_{IN} - K_1 (\Delta S).$$

Eq. (1)

Where $T'_{IN}$ is the inlet coolant temperature that provides comfort for the wearer in a sedentary mode, $\Delta S$ is the increment in the evaporative water loss rate with respect to a basal evaporation water loss rate $S'$ that provides comfort for the wearer in a sedentary mode, and $K_1$ is a proportionality constant.

In another feature of the present invention, the evaporative water loss rate of the wearer, as encompassed in an air ventilated suit, is obtained by determining the incremental change in a hygrometer reading of the outlet air stream of the air ventilated garment with respect to a basal outlet air stream hygrometer reading that provides comfort for the wearer in a sedentary mode, while holding the moisture content of the inlet air stream to the ventilated suit constant at a relatively low value.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram, partly in block diagram form, of a temperature controller for a fluid cooled garment incorporating features of the present invention.

FIG. 2 is a plot of skin temperature in degrees F and degrees C as a function of heat load on the wearer in BTU per hour for various sweat rates and depicting, in cross hatching, the comfort zone for the wearer.

FIG. 3 is a schematic block diagram of a temperature controller of the present invention.

FIG. 4 is a schematic diagram, partly in block diagram form, for a temperature controller of the present invention.

FIG. 5 is a schematic diagram, partly in block diagram form, of a fluid coolant supply system for the temperature controller of the present invention.

DESCRIPTION OF THE PREFERRED EMBODIMENTS

Figure 6:
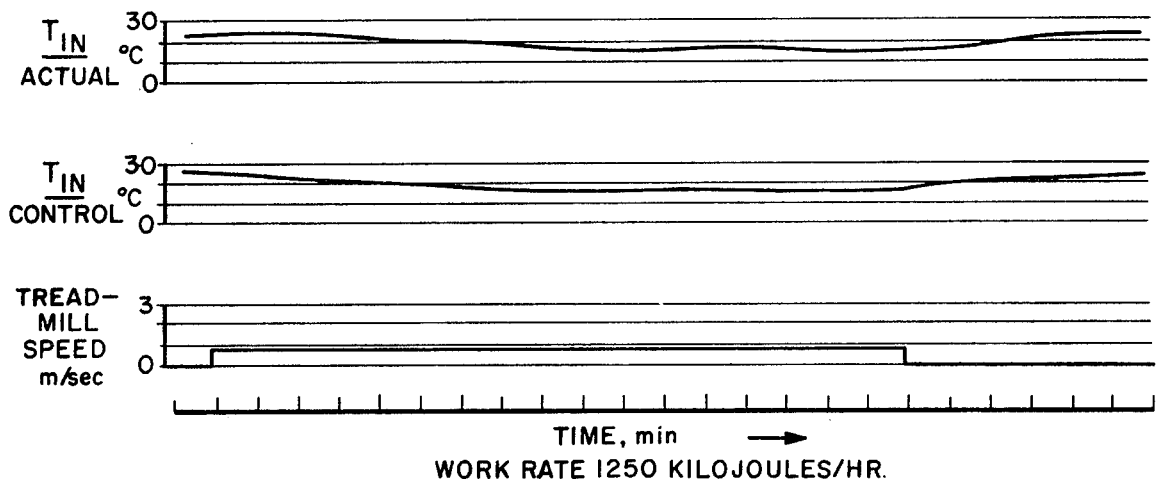
FIG. 6 is a composite plot of actual inlet coolant temperature, desired coolant temperature, and treadmill speed in meters per second as a function of time for a wearer's work rate of 1,250 kilojoules per hour.

Referring now to FIG. 1, there is shown an air ventilated whole body space suit 1, as worn, for example, by an astronaut. A fluid cooled garment, not shown, is worn inside the space suit 1. In a typical example, the fluid coolant for the fluid cooled garment is water. Fluid coolant is supplied to the fluid cooled garment via input line 2 and the heated output fluid coolant is withdrawn from the garment via output line 3 and thence fed to a heat sink or water cooler, as more fully disclosed below with regard to FIG. 4. The temperature of the inlet fluid coolant is controlled by a temperature controller 4 and mechanical linkage 5 which controls a diverter valve 6 for mixing more or less hot and cold water from respective supplies and directing the mixture through a heat exchanger in heat exchanging relation with the return flow of coolant to the liquid cooled garment for controlling the temperature of the inlet coolant to the liquid cooled garment. The heat exchanger and diverter valve system is shown in greater detail in FIG. 5.

The space suit 1 is ventilated by a flow of air therethrough. Inlet air is supplied to the suit 1 via input line 7 and air is withdrawn from the suit via output line 8. A pair of hygrometers 9 and 10 are connected in gas communication with the respective air lines 7 and 8 for monitoring the moisture content (humidity) of the inlet and outlet air streams of the suit 1. The moisture content measurements are fed to the controller logic 4 for use therein to determine the proper control of the inlet liquid coolant temperature for maintaining the comfort of the wearer under various work load rates, as more fully disclosed below.

Referring now to FIG. 2, there is shown a plot of skin temperature in degrees Fahrenheit and Centigrade as a function of the heat load in BTU per hour on the wearer of the space suit for various values of sweat rate. The comfort zone is shown by crosshatching. The comfort and sweat rate data shown in FIG. 2 illustrate three interelated concepts applicable to subjects wearing a cooling garment such as a liquid cooled garment. These three concepts are as follows: (1) Skin temperature should decrease with increasing heat load. (2) Zero sweat rate is not necessary and may not be preferable at the higher heat loads. (3) Sensible cooling of the skin can be directly related to the increase of sweat rate with increasing heat loads.

With these concepts defined, the fluid cooled garment temperature controller of the present invention is based upon the utilization of the evaporative water loss rate as a primary input signal. More particularly, the controller logic for controller 4 is designed such that the fluid cooled garment coolant inlet temperature $T_{IN}$ is inversely proportional to the wearer's evaporative water (heat) loss.

The controller 4 regulates $T_{IN}$ as a function of two parameters:

a. A basal inlet water temperature $T'_{IN}$ and, b. the increment $\Delta \dot{S}$ in evaporative water loss rate with respect to a basal rate $\dot{S}'$. $T'_{IN}$ is the coolant temperature which provides comfort for the subject wearer in a sedentary mode, and $\dot{S}'$ is the corresponding rate of the evaporative water loss (which includes insensible water loss as well as loss due to active sweating). The controller algorithm is:

$$T_{IN} = T'_{IN} - K_1 (\Delta \dot{S}).  \quad \text{Eq. (1)}$$

Referring now to FIG. 3 there is shown a schematic closed loop block diagram for the liquid cooled garment temperature controller of the present invention operating according to the algorithm of Eq. (1). More particularly, a sedentary input temperature reference signal $T'_{IN}$ for the inlet coolant is fed to the controller 4 to control the temperature of the coolant input of the liquid cooled garment 11 which is in heat exchanging relation with the wearer 12. Heat Q is being removed from the wearer 12 at a certain rate and the wearer 12 produces a certain evaporative water loss rate $\dot{S}$ which is sensed and fed to an error detector 13 for comparison with a predetermined sedentary reference evaporative water loss signal $\dot{S}'$ to produce an error or incremental evaporative water loss rate signal $\Delta \dot{S}$. When the sensed evaporative water loss rate $\dot{S}$ is equal to the sedentary evaporative water loss rate $\dot{S}'$ the incremental evaporative water loss rate $\Delta \dot{S}$ is 0 and the controller continues to supply liquid coolant to the liquid cooled garment 11 at the reference sedentary inlet temperature $T'_{IN}$.

However, when the sensed evaporative water loss rate $\dot{S}$ differs, due to increased work rate load on the wearer, from the sedentary value $\dot{S}'$, the difference $\Delta \dot{S}$ is fed to the controller as an error signal for causing the controller 4 to lower the temperature of the inlet coolant fluid to the liquid cooled garment 11 by a value proportional to the incremental change in evaporative water loss rate $\Delta \dot{S}$.

$\Delta \dot{S}$ can be expressed as a function of air flow rate $\dot{w}$; outlet air dew point $T_{dp_{OUT}}$ during exercise; inlet air dew point $T_{dp_{IN}}$ during exercise; and the outlet and inlet air dew point measured with the wearer in a sedentary mode $T'_{dp_{OUT}}$, $T'_{dp_{IN}}$, respectively, as follows:

$$\Delta \dot{S} = K_2 \dot{w} [(T_{dp_{OUT}} - T'_{dp_{OUT}}) - (T_{dp_{IN}} - T'_{dp_{IN}})] \quad \text{Eq. (2)}$$

$$T_{IN} = T'_{IN} - K_3 \dot{w} [(T_{dp_{OUT}} - T'_{dp_{OUT}}) - (T_{dp_{IN}} - T'_{dp_{IN}})] \quad \text{Eq. (3)}$$

where $K_3$ is a proportionality constant equal to $(K_1 \cdot K_2)$, where $K_1$ is the proportionality constant of equation (1) and $K_2$ is the proportionality constant of equation (2). $K_1$ and $K_2$ are constants which are derived empirically and which reflect an individual's preference for a drop in $T_{IN}$ as evaporative water loss increases.

Initial operation of the controller 4 with the wearer in a sedentary state allows $T'_{dp_{OUT}}$, $T'_{dp_{IN}}$, and $T'_{IN}$ to be manually set for the particular air ventilation system and liquid cooled garment in use. These quantities need only be established during the initial phase of the first operation as these values should remain constant.

With the controller 4 in operation, any increase in water loss above the basal evaporative water loss rate will bring about a lowered cooling garment temperature, thus, the controller causes the liquid cooled garment to assist the wearer's normal mechanisms for removal of heat by supplementing evaporative heat loss with conductive (sensible) heat removal.

Referring now to FIG. 4 there is shown, in schematic diagram form, a specific embodiment of a controller 4 incorporating features of the present invention and operating according to the algorithms of equation (1) and (3). More particularly, hygrometer 9 senses the moisture content in the air inlet stream to the pressure suit 1 to derive an inlet dew point temperature electrical quantity $\bar{T}_{dp_{IN}}$ which is fed to one input of a differential operational amplifier 15 for comparison with predetermined sedentary air inlet dew point temperature signal $T'_{dp_{IN}}$ to derive an output corresponding to the difference between the two inputs. The output is fed to the input of an inverter 16. The output of the inverter 16 is fed to one input of a differential operational amplifier 17 for a comparison with a sensed air outlet moisture measurement. More particularly, the output hygrometer 10 senses the moisture content in the air outlet stream from the pressure suit 1 to derive an output signal $T_{dp_{OUT}}$ corresponding to the dew point temperature of the air outlet stream. The output dew point temperature signal is fed to one input of a differential operational amplifier 18 for comparison with the reference dew point temperature $T'_{dp_{OUT}}$ corresponding to the sedentary outlet dew point temperature to derive a difference signal which is fed to the other input of the differential operational amplifier 17.

The output of differential operational amplifier 17 is fed to one input of a multiplier 19 for multiplication with a reference signal $K_3 \dot{w}$ corresponding to a proportionality constant $K_3$ times the air flow rate through the pressure suit 1. The output of the multiplier 19 corresponds to $K_1 \Delta \dot{S}$ of equation (1) which is then fed to one input of the differential operational amplifier 21 for comparison with the reference input corresponding to the sedentary liquid coolant inlet temperature $T'_{IN}$ to derive an output signal corresponding to the desired liquid coolant inlet temperature to the liquid cooled garment, namely, $T_{IN}$.

The desired fluid coolant inlet temperature signal $T_{IN}$ is thence fed to one input of a differential amplifier 22 for comparison with a signal $T_{LCG}$ corresponding to the actual temperature of the inlet fluid coolant to the liquid cooled garment as sensed by a temperature sensor 23. The output of the differential operational amplifier 22 is an error signal which is fed to a valve controller 24 for controlling the diverter valve 6 via the mechanical linkage 5 for mixing water from the hot water supply with water from the cool water supply in such a manner as to cause the actual temperature of the inlet coolant to the liquid cooled garment, as sensed by sensor 23, to correspond with the desired inlet coolant temperature $T_{IN}$. The supply of warm water and cool water to the diverter valve 6 is obtained by splitting the warm output water from the liquid cooled garment, as derived from outlet tubing 3, into a pair of streams 25 and 26 to be fed through a water cooler or heat sink to form the cool water supply.

Referring now to FIG. 5, a physical realization of the diverter valve 6, and hot and cold water supplies is shown. More particularly, exhaust coolant from the liquid cooled garment is fed via outlet pipe 3 through a heat exchanger 28 for cooling the flow of liquid coolant to the desired inlet temperature $T_{IN}$, as returned via pipe 2 to the liquid cooled garment. The coolant supplied to the other side of the heat exchanger 28 is derived from the output of the diverter valves 6 which are connected such that in one extreme position all of the hot water is held back by one of the diverter valves while all of the cold water supply is passed through the diverter valve to the heat exchanger 28. In the other extreme setting of the diverter valves 6, all of the hot water supply passes through the diverter valve 6 to the heat exchanger and all of the cold water is held back. The heated output flow from the heat exchanger in line 25 serves to form the hot water supply and a certain fraction of that flow is passed through the heat sink or cooler 27 to form the cold water supply.

In an alternative embodiment, the controller logic, as outlined above with regard to equation (3) and as shown in greater detail in the schematic drawing of FIG. 4, is substantially reduced by supplying inlet air to the air ventilated pressure suit 1 with a constant low dew point at all times. In such a case, the term $(T_{dp_{IN}} - T'_{dp_{IN}})$ in logic equation (3) and as shown in FIG. 4 equals 0. Thus, it is necessary to measure only the dew point of the outlet air of the ventilated garment or suit 1. In this manner, the inlet air hygrometer 9, operational differential amplifier 15, inverter 16 and operational differential amplifier 17 in FIG. 4 are eliminated, thereby, substantially decreasing the complexity of the controller 4 and moisture sensing portions of the system.

The controller 4 was tested with subjects wearing a whole-body air-ventilated suit over a liquid cooled garment. The dew point of the suit inlet air was kept approximately constant at minus 2° C. The inlet air temperature was maintained at 20° C with an air circulation of 29 cubic meters per hour. The dew point of the suit outlet air, thus, became the only variable used in controlling $T_{IN}$. The wearer exercised on a treadmill at various metabolic rates; the metabolic rates were calculated based on oxygen consumption measurements during the test. During the initial test, subjective evaluations of thermal comfort were recorded while several values of the proportionality constants $K_1$ and $K_2$ were set in the analog computer, which served as the controller 4 for the test. Based on these evaluations, proportionality constants selected for the controller equations were $K_1 = 0.09$ [(° C · hr)/gm] and $K_2 = 0.40$ [gm/(m³ · ° C)].

Figure 7:
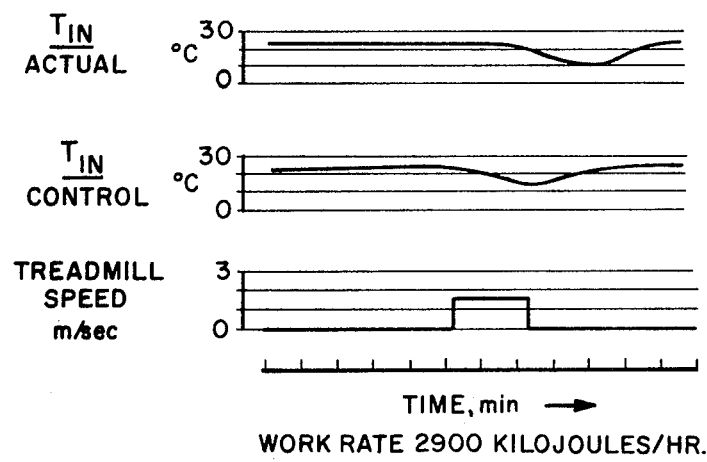
FIG. 7 is a composite plot similar to that of FIG. 6 for a work rate of 2,900 kilojoules per hour.

FIGS. 6 and 7 show recorder tracings of treadmill speed, $T_{IN}$|control and $T_{IN}$|actual for two levels of exercise, namely, 1,250 kilojoules per hour and 2,900 kilojoules per hour. The subjects were kept thermally comfortable during the tests illustrated and for all tests with work rates with up to about 3,000 kilojoules/hr.

In an alternative embodiment of the present invention, the controller logic is formulated to adjust coolant inlet temperature $T_{IN}$ to the liquid cooled garment such that the wearer's sensible heat loss is kept proportional to his latent heat loss, thereby maintaining an acceptable balance between the normal modes of heat transfer. Heat losses are determined from the measurements of the inlet and outlet liquid cooled garment and ventilating air temperatures and the wearer's evaporative water loss rate. $T_{IN}$ to the liquid cooled garment is increased or decreased depending on whether sensible heat loss is too large or too small with respect to the latent heat loss.

In still another alternative embodiment, the controller logic is formulated to keep the evaporative water loss rate constant at a set level, (i.e., 100 grams per hour). The controller varies $T_{IN}$ inversely with respect to any change in evaporative water loss rate. To perform correctly, the controller set point is set above the wearer's normal insensible water loss rate; therefore, a slight amount of evaporative water loss rate occurs at all times.

The evaporative water loss controller of the present invention has the advantage that it does not require sensors to be affixed to the crewmen for operation. All sensing of the crewmen's thermal state is done remotely from the man. No skin excoriation, itching or other discomfort arises from the use of this controller. An additional consideration, is that this controller, by sensing evaporative water loss, utilizes the only single integrated measure of the body's thermal status.

We claim:

1. In a method for controlling the temperature of a fluid cooled garment on the body of a wearer the steps of, determining the evaporative water loss rate of the wearer, and controlling the temperature of the inlet fluid coolant stream to the fluid cooled garment as a function of the evaporative water loss rate.

2. The method of claim 1 wherein the temperature of the inlet coolant stream to the fluid cooled garment is controlled in inverse proportion to the evaporative water loss rate.

3. In a method for controlling the temperature of a fluid cooled garment on the body of a wearer the steps of, controlling the inlet fluid coolant temperature $T_{IN}$ according to the algorithm:

$$T_{IN} = T'_{IN} - K_1 (\Delta \dot{S})$$

where $T'_{IN}$ is the inlet coolant temperature that provides comfort for the wearer in a sedentary mode, $\Delta \dot{S}$ is the increment in evaporated water loss rate with respect to a basal evaporative water loss that provides comfort for the wearer in a sedentary mode, and $K_1$ is a proportionality constant.

4. The method of claim 1 wherein an air ventilated suit having an inlet air stream and an outlet air stream encompasses the wearer and said fluid cooled garment, and wherein the steps of determining the evaporated water loss rate includes the steps of; determining the incremental change in dew point of the outlet air stream with respect to a basal outlet air stream dew point that provides comfort to the wearer in a sedentary mode, holding substantially constant the dew point of the inlet air stream to the ventilated garment, and determining the air flow rate through said ventilated garment.

5. In a fluid cooled garment, means for determining the evaporative water loss rate of the wearer of the garment, and means for controlling the temperature of the inlet fluid coolant stream to the fluid cooled garment as a function of the determined water loss rate.

6. The apparatus of claim 5 wherein said controller means controls the temperature of the inlet fluid coolant stream in inverse proportion to the determined wearer's evaporative water loss rate.

7. The apparatus of claim 5 including, a gas tight second garment encompassing said wearer and said fluid cooled first garment and having an inlet air stream and an outlet air stream for ventilating said second garment, and wherein said means for determining the wearer's evaporative water loss rate includes, means for determining the incremental change in dew point of the outlet air stream of said second garment with respect to a basal outlet air stream dew point that provides comfort for the wearer in a sedentary mode, and means for holding the dew point of the inlet air stream to said ventilated second garment approximately constant at a value substantially below the dew point of the outlet air stream.

8. In a fluid cooled garment, means for passing a fluid coolant through the garment in heat exchanging relation with the body of the wearer for cooling the body of the wearer, means for controlling the inlet temperature $T_{IN}$ of the stream of fluid coolant passing through the garment in accordance with the algorithm:

$$T_{IN} = T'_{IN} - K_1 (\Delta \dot{S})$$

where $T'_{IN}$ is the inlet fluid coolant temperature that provides comfort for the wearer in a sedentary mode, $\Delta \dot{S}$ is the incremental change in the wearer's evaporative water loss rate with respect to a basal evaporative water loss rate that provides comfort for the wearer in a sedentary mode, and $K_1$ is a proportionality constant.

* * * * *